United States Patent [19]

Nagai et al.

[11] Patent Number: 5,326,846
[45] Date of Patent: Jul. 5, 1994

[54] PROCESS FOR PRODUCING IMPACT-RESISTANT POLYACETAL RESIN COMPOSITION

[75] Inventors: Satoshi Nagai; Masao Hasegawa; Hiroshi Mimura; Makoto Kobayashi, all of Hiratsuka, Japan

[73] Assignee: Mitsubishi Gas Chemical Company, Inc., Tokyo, Japan

[21] Appl. No.: 41,197

[22] Filed: Apr. 1, 1993

[30] Foreign Application Priority Data

Apr. 4, 1992 [JP] Japan .................................. 4-082535

[51] Int. Cl.$^5$ ............................................ C08G 18/00
[52] U.S. Cl. ...................................... 528/44; 528/59;
    528/60; 528/61; 528/63; 528/64; 528/67;
    528/86; 525/398; 525/399; 525/452; 525/453;
    525/456; 524/386; 524/387
[58] Field of Search ................ 528/44, 59, 60, 61,
    528/63, 64, 67, 86; 525/398, 399, 452, 453, 456,
    56; 524/386, 387

[56] References Cited

U.S. PATENT DOCUMENTS

| 4,929,712 | 5/1990 | Sugiyama . |
| 4,946,906 | 8/1990 | Yano . |
| 5,183,860 | 2/1993 | Kashihara ............... 525/398 |

FOREIGN PATENT DOCUMENTS 1017244  1/1966  United Kingdom .

Primary Examiner—John Kight, III
Assistant Examiner—Duc Truong
Attorney, Agent, or Firm—Wenderoth, Lind & Ponack

[57] ABSTRACT

A process for producing an impact-resistant polyacetal resin composition, which comprises mixing with shear a polyacetal resin (A), a thermoplastic polyurethane (B), a polyhydric alcohol (C) having at least three hydroxyl groups in the molecule and at least one compound (D) selected from the group consisting of a polyisocyanate ($d_1$) and a compound ($d_2$) which generates a polyisocyanate under heat, while at least two components (A) and (B) are melted. An injection-molded article from the impact-resistant polyacetal resin composition, provided by the above process, exhibits superior tensile strength and elongation at break at weld portions.

10 Claims, No Drawings

PROCESS FOR PRODUCING IMPACT-RESISTANT POLYACETAL RESIN COMPOSITION

BACKGROUND OF THE INVENTION

This invention relates to a process for producing a novel polyacetal resin composition which is conveniently used as a material for such parts as clips, springs, gears, bearings, cams, levers and the like in electrical and electronical machines, office machines, automobiles, industrial machines, toys and/or sports goods, etc.

PRIOR ARTS

Polyacetal has found wide usages as an engineering plastics excelling in mechanical properties, electrical properties and chemical properties such as chemical resistance. Its usages are limited, however, because of its inferior impact resistance compared to that of other engineering plastics. As a method to improve impact resistance, i.e., impact strength, of polyacetal, a means to blend a thermoplastic polyurethane elastomer with polyacetal has been proposed.

For example, U. K. Patent 1,017,244 discloses a thermoplastically deformable composition, which comprises a polyurethane of high molecular weight at least 8,000 and a polyoxymethylene of molecular weight at least 4,000, the ratio of the polyurethane to the polyoxymethylene being from 5:95% by weight to 95:5% by weight.

Further, a method in which a thermoplastic polyurethane elastomer is incorporated into a polyacetal to improve the polyacetal in impact resistance has been already put to practical use.

However, shaped articles formed by injection molding such compositions of polyacetal blended with thermoplastic polyurethane elastomers generally exhibit, while they do show improved impact resistance, reduced tensile strength and elongation at break at weld portions, providing one reason for easy breakage of the injection-molded articles by external forces. Hence, improvements in that aspect are in demand as well as still greater improvement in impact resistance.

Further, Japanese Laid-open Patent Publication No. 132,117/1990 (corresponding to U.S. Pat. No. 4,929,712) discloses a polyacetal resin composition obtained by melting and kneading a polyacetal and a thermoplastic polyurethane in the presence of an optionally modified polyisocyanate or polythioisocyanate compound.

There are also other proposals for a method of polymerizing an isocyanate compound with long chain polyol in the presence of polyacetal [Japanese KOKAI (Laid-Open) Patent Publications Nos. 182,328/1988 (corresponding to U.S. Pat. No. 4,946,906) and 196,649/1988 (corresponding to European Patent No. 277,630)]. Alloys of polyacetal and polyurethane elastomers proposed therein exhibit better impact strength compared to the compositions obtained by simply melt-mixing polyacetal and polyurethane elastomer.

SUMMARY OF THE INVENTION

An object of the present invention is to provide a process for producing a novel polyacetal resin composition.

A more specific object of the present invention is to provide a process for producing a novel polyacetal resin composition whose basic components are a polyacetal resin and a thermoplastic polyurethane, which gives injection-molded shaped articles showing well-balanced various physical properties such as tensile strength and elongation at break at weld portions and impact resistance.

According to the present invention, the above objects and advantages of the present invention are achieved by a process for producing an impact-resistant polyacetal resin composition, which comprises mixing with shear a polyacetal resin (A), a thermoplastic polyurethane (B), a polyhydric alcohol (C) having at least three hydroxyl groups in the molecule, and at least one compound (D) selected from the group consisting of a polyisocyanate ($d_1$) and a compound ($d_2$) which generates a polyisocyanate under heat, while at least two components (A) and (B) are melted.

Injection-molded articles from the novel polyacetal resin composition, provided by the present invention, exhibit superior tensile strength and elongation at break at weld portions in comparison with those of injection-molded articles from polyacetal resin compositions consisting essentially of a polyacetal resin (A) and a thermoplastic polyurethane (B) and, furthermore, in many cases exhibit remarkably high impact resistance. Therefore, the novel polyacetal resin composition provided by the process of this invention exhibits an excellent balance among the above-mentioned physical properties.

The present invention is described in further details hereafter, whereby the objects and advantages of the invention will become all the more clear.

DETAILED DESCRIPTION OF THE INVENTION

The polyacetal resin (A) used in the present invention contains oxymethylene units as the chief recurring unit, preferably in an amount of at least 50 mol %. The polyacetal resin (A) includes an oxymethylene homopolymer composed substantially of an oxymethylene unit, which can be prepared from formaldehyde or trimer thereof (trioxane); an oxymethylene copolymer containing up to 20% by weight of $C_2$–$C_8$ hydroxyalkylene units, whose hydrogen may be substituted by halogen, which can be prepared from formaldehyde or trimer thereof (trioxane) and $C_2$–$C_8$ cyclic ether such as ethylene oxide, epichlorohydrin, 1,3-dioxolane, 1,3,5-trioxepane, formal of glycol and formal of diglycol; an oxymethylene block copolymer or graft copolymer which contains the above oxymethylene homopolymer or copolymer as the main structure, and further contains block chains or terminal structure other than oxymethylene unit; and a crosslinked oxymethylene polymer.

Some of commercially available resins can be used as the polyacetal resin (A), or, the resins used as the polyacetal resin (A) can be prepared by methods known per se.

It is preferred that the polyacetal resin (A) has a melt index (MI) of at least 0.01, in particular from 0.1 to 100, as measured at 190° C. under a load of 2.16 kg according to ASTM-D 1238.

Commercial polyacetal resins are available in a form of powder, flake or pellet, any of which forms can be used in the present invention.

Commercial polyacetal resins are incorporated with stabilizers or antioxidants so that their decomposition under the actions of oxygen, heat, water and light, etc. is inhibited. Typical examples of such additives include melamine, melamine resin, cyanoguanidine, polyamide, hindered phenol and hindered amine. The additives as stabilizers or anti-oxidants which are blended in commercial polyacetal resins effectively function to improve heat stability of the composition of the present invention and, in most cases, do not adversely affect or provide hindrances to the effect of the present invention. Accordingly, polyacetal resins blended with those additives are used with preference.

The thermoplastic polyurethane (B) used in the present invention can be obtained through a reaction of a diisocyanate with a diol having hydroxyl groups at its molecular terminals by a method known per se. The polyurethane (B) contains urethane linkages in the polymer main chain. In the occasion of reacting diisocyanate with diol, a chain-extending agent may be additionally used. In the above reaction, the molar ratio (NCO/OH) of the isocyanate group to the hydroxyl group ranges preferably 0.5 to 2, more preferably 0.9 to 1.5.

As the diisocyanates, $C_4$ to $C_{50}$, in particular $C_6$ to $C_{40}$, aromatic, alicyclic or aliphatic diisocyanates are preferred. More specifically, preferred diisocyanates include: diphenylmethane-4,4'-diisocyanate, tolylene diisocyanate, naphthylene diisocyanate, diphenyl diisocyanate, p,p'-benzidine diisocyanate, durene diisocyanate, 1,6-hexamethylene diisocyanate, lysine diisocyanate, 4,4'-methylene-bis-(cyclohexylisocyanate), m-xylylene diisocyanate and p-xylylene diisocyanate.

As a diisocyanate, diphenylmethane-4,4'-diisocyanate, tolylene diisocyanate, 1,6-hexamethylene diisocyanate, m-xylylene diisocyanate and isophorone diisocyanate are particularly preferred.

The diol component constituting the thermoplastic polyurethane (B) can be suitably selected from polyether diol, polyester diol, polyetherester diol and polycarbonate diol of number average molecular weight ranging preferably from 500 to 5000, more preferably from 1,000 to 3,000.

Specific preferred examples of the polyether diol include polyethylene glycol, polypropylene glycol, polytetramethylene glycol and polyhexamethylene glycol.

The polyether diol can be obtained by ring-opening polymerization of $C_2$–$C_{12}$ cyclic ether such as ethylene oxide, propylene oxide and tetrahydrofuran.

The polyester diol has the main structure of polyester and hydroxyl groups at two terminals of the molecular chain. It can be prepared from dihydric alcohol and dicarboxylic acid by an esterification or ester-interchange reaction. It is also possible to produce a polyester diol by ring-opening polymerization of lactone. As the preferred dihydric alcohol, $C_2$–$C_{12}$ alkanediol such as ethylene glycol, propylene glycol, 1,4-butanediol, 1,3-butanediol, 1,5-pentanediol, 3-methyl-1,5-pentanediol, 1,6-hexanediol, neopentylglycol, 2-methyl-propanediol, 2-methyl-1,8-octanediol, nonanediol and 1,10-decanediol can be used. And, as the dicarboxylic acid, $C_4$–$C_{12}$ aliphatic or $C_8$–$C_{12}$ aromatic dicarboxylic acid such as glutaric acid, adipic acid, pimelic acid, suberic acid, sebacic acid, terephthalic acid and isophthalic acid are preferably used. Also as the lactone, $C_4$–$C_{10}$ lactone such as caprolactone, propiolactone and varelolactone can be given as preferred examples.

The polyetherester diol has an ester group and an ether group in its main chain and hydroxyl groups at the two terminals. Such polyetherester diol can be obtained, for example, by reacting the above polyether diol with a dicarboxylic acid anhydride to convert the terminal group to a carboxyl group, and further reacting it with cyclic ether.

As the dicarboxylic acid anhydride, those having 4 to 15 carbons such as phthalic anhydride, maleic anhydride, succinic anhydride and tetrahydrophthalic anhydride are preferably used.

As the cyclic ether, those having 2 to 7 carbon atoms such as ethylene oxide, propylene oxide and tetrahydrofuran can be preferably used.

The polycarbonate diol has a carbonate group in its main chain and two hydroxyl groups at its molecular chain terminals. The polycarbonate diol can be obtained through a reaction of a dihydric alcohol or phenol with diphenyl carbonate or phosgene. As the dihydric alcohol, $C_2$–$C_{12}$ alkanediol such as ethylene glycol, propylene glycol, 1,4-butanediol, 1,3-butanediol, 1,5-pentanediol, 3-methyl-1,5-pentanediol, 1,6-hexanediol, neopentyl glycol, 2-methylpropanediol, 2-methyl-1,8-octanediol, nonanediol and 1,10-decanediol can be used as preferred examples.

As the chain-extending agent which may serve as a constituent of the thermoplastic polyurethane (B), aliphatic, alicyclic or aromatic diol or diamines having number average molecular weight of less than 500, preferably from 60 to 300, are used. Preferred examples of such diols include ethylene glycol, 1,3-propylene glycol, 1,2-propylene glycol, 1,4-butanediol, 1,5-pentanediol, 1,6-hexanediol, 1,4-cyclohexanediol, hydroquinonediethylolether, 1,4-bishydroxyethylbenzene, resorcinediethylolether and hydrogenated bisphenol A. As the diamine, ethylenediamine, hexamethylenediamine, xylylenediamine and 4,4'-diaminodiphenylmethane can be preferably used.

The melt flow rate of the thermoplastic polyurethane (B) measured at 190° C. under a load of 21.6 kg according to ASTM D 1238 is preferably at least 0.1, more preferably 1 to 100.

The polyhydric alcohol which is the component (C) contains at least three hydroxyl groups, preferably 3 to 50 hydroxyl groups, in the molecule. The polyhydric alcohol (C) preferably contains 3 to 100 carbon atoms, in particular, 3 to 50 carbon atoms. More specifically, as the polyhydric alcohols (C), glycerine, trimethylolethane, trimethylolpropane, hexanetriol, triethanolamine, diglycerine, pentaerythritol, tetraethanol ethylenediamine, methylglucosite, aromatic diamine-tetraethanol adduct, sorbitol, dipentaerythritol, cyclodextrin and sugar can be preferably used. Further, a polymer having hydroxyl groups in its polymer chain such as phenoxy resin or polyvinyl alcohol can also be used as the polyhydric alcohol (C).

The polyisocyanate ($d_1$) preferably has 4 to 50 carbon atoms, particularly preferably has 8 to 30 carbon atoms. Specific examples of the polyisocyanate ($d_1$) include diphenylmethane-4,4'-diisocyanate, tolylenediisocyanate, naphthylenediisocyanate, diphenyldiisocyanate, 1,6-hexamethylenediisocyanate, isophoronediisocyanate, 4,4'-methylene-bis(cyclohexylisocyanate), m-xylylenediisocyanate, p-xylylenediisocyanate, hydrogenated m-xylylenediisocyanate and hydrogenated p-xylylenediisocyanate.

The compound ($d_2$) which generates a polyisocyanate under heat includes a dimer of the above polyisocyanate ($d_1$), a trimer of the polyisocyanate ($d_1$), an adduct of the polyisocyanate ($d_1$) with a carbodiimide, a prepolymer of the polyisocyanate ($d_1$) and the polyhydric alcohol (C), and a blocked polyisocyanate obtaining by blocking the polyisocyanate ($d_1$) with any one of blocking agents such as a phenol, a primary alcohol and caprolactam.

In addition to the above starting materials (A), (B), (C) and (D), a small amount of an aliphatic diol, an aromatic diol or a diamine may be additionally incorporated. Examples of the aliphatic diol and aromatic diol include ethylene glycol, 1,3- or 1,2-propylene glycol, 1,4-butanediol, 1,5-pentanediol, 1,6-hexanediol, 1,4-cyclohexanediol, hydroquinone diethylol ether, 1,4-bishydroxyethylbenzene, resorcin diethylol ether and hydrogenated bisphenol A. Examples of the diamine include ethyl diamine, hexamethylene diamine, xylylene diamine and 1,4-diaminodiphenylmethane. The amount of the above additional component based on the polyhydric alcohol (C) is preferably 10 mol % or less.

In the present invention, the polyacetal resin composition can be obtained by mixing with shear the polyacetal resin (A), the thermoplastic polyurethane (B), the polyhydric alcohol (C) having at least three hydroxyl groups in the molecule and at least one compound (D) selected from the group consisting of the polyisocyanate ($d_1$) and the compound ($d_2$) which generates a polyisocyanate under heat, while at least two components (A) and (B), preferably all components (A), (B), (C) and (D), are melted.

The thermoplastic polyurethane (B) can be blended with the polyacetal resin (A) in advance, then further melt-mixed with a polyhydric alcohol (C) and the polyisocyanate (D) with shear. Therefore, it is permissible to select from commercially available polyacetal resins adequately blended with a thermoplastic polyurethane. In such a case, it is also possible to further blend a thermoplastic polyurethane into such commercial polyacetal resin blends. Those polyhydric alcohols included in the examples of the polyhydric alcohol (C), may be used in combination in a proper mixing ratio according to the intended use of the composition resulting from the process of the present invention, which are mixed at a suitable ratio.

It is also possible to obtain the polyacetal resin composition of the present invention by the steps of melt-mixing the polyhydric alcohol or alcohols (C) with the polyacetal resin (A) in advance, then blending the mixture with the thermoplastic polyurethane (B) and the compound (D) and mixing the blend in molten state in the presence of shear.

Further, the compound (D) may be preliminarily melt-mixed with the polyacetal resin (A).

In the process of the present invention, the mixing weight ratio of the polyacetal resin (A), the thermoplastic polyurethane (B), the polyhydric alcohol (C) and the compound (D) preferably satisfies the following equations (1), (2) and (3), more preferably the following equations (1'), (2') and (3').

$$(A)/(B) = 97/3 \text{ to } 60/40 \quad (1)$$

$$(C)/\{(A)+(B)\} = 0.01/100 \text{ to } 10/100 \quad (2)$$

$$(D)/\{(A)+(B)\} = 0.01/100 \text{ to } 10/100 \quad (3)$$

$$(A)/(B) = 95/5 \text{ to } 50/50 \quad (1')$$

$$(C)/\{(A)+(B)\} = 0.05/100 \text{ to } 7/100 \quad (2')$$

$$(D)/\{(A)+(B)\} = 0.05/100 \text{ to } 7/100 \quad (3')$$

wherein (A), (B), (C) and (D) represent the weights of the components (A), (B), (C) and (D), respectively, provided that when the compound (D) is the compound ($d_2$) which generates a polyisocyanate under heat, the stoichiometric amount of the polyisocyanate to be generated should be taken as the weight of the compound (D).

The weight ratio within the above-specified range contributes to the favorable balance between impact strength and tensile strength as well as elongation at break of weld portions of injection-molded articles of polyacetal resin compositions of the present invention. Further, the mixing weight ratio in the above range serves to decrease the interlaminar peeling on the injection-molded article and to maintain the moldability and flowability of the composition.

The molar ratio of the isocyanate group of the compound (D) to the hydroxyl group of the polyhydric alcohol (C) (NCO/OH), or the molar ratio of the isocyanate group of the polyisocyanate to be stoichiometrically generated when the compound (D) is the compound ($d_2$) to the hydroxyl group of the polyhydric alcohol (C) (NCO/OH), is preferably 0.05/1 to 1/0.05, more preferably 0.1/1 to 1/0.1.

In the process of the present invention, a very small amount of a catalyst may be incorporated for promoting a reaction to form a crosslinked polyurethane, i.e., a reaction between the isocyanato group and the hydroxyl group. The above catalyst is properly selected from conventionally known urethanation catalysts. Specific examples of the catalyst include tertiary amines such as triethylamine, tributylamine, triethanolamine, N-ethylmorpholine, picoline and diethylaniline; organic tin compounds such as dibutyltin dilaurate, tin octylate and tributyltin acetate; and other compounds such as cobalt naphthenate, lead octylate, titanic acid ester. The amount of the catalyst based on the total amount of the components (A), (B), (C) and (D) is preferably 0.0001% to 0.1% by weight.

The components (A), (B), (C) and (D) are mixed under a shear force at a temperature between 180° and 250° C., preferably between 180° and 240° C. The shearing rate is preferably 1 to $10^4$ sec$^{-1}$, more preferably 5 to $10^4$ sec$^{-1}$. The mixing under above-specified conditions contributes to the formation of a homogeneous polyacetal resin composition to exhibit well balanced physical properties as a molded article.

The mixing can be carried out, for example, with any one of a monoaxial extruder, twin screw co-rotating extruder, twin screw counter-rotating extruder, co-kneader, disc pack and an internal mixer such as Bumbury mixer, and no special facilities are required. Of those apparatuses, particularly twin-screw co-rotating extruder and co-kneader exhibit sufficient shear-mixing ability, and hence can be conveniently used.

The mixing time depends on the resin temperature within the apparatus and the shear mixing power of the apparatus in individual case and cannot be definitely specified. Normally, however, the time ranges from 5 seconds to 30 minutes.

According to the present invention, if necessary, any one of other known additives such as a stabilizer, ultraviolet absorber, releasing agent, lubricant, pigment, glass fiber, carbon fiber, and the like may be added in a suitable amount within the range not detrimental to the physical properties of the resultant polyacetal resin composition.

The polyacetal resin composition, provided in accordance with the process of the present invention, exhibit well balanced physical properties such as tensile strength and elongation at break at weld portions of injection-molded articles therefrom, and impact strength, etc. Consequently, the polyacetal resin compositions of the present invention are excellent as injection-molding materials of electric, electronic and automobile parts. Moreover, since the process of the present invention requires no special equipment, the polyacetal resin composition can be easily produced at industrial scales and at low costs.

Hereinafter the invention is explained in further details, referring to Examples and Comparative Examples, it being understood that the invention is not limited thereto.

In the following Examples and Comparative Examples, the methods of preparation of test specimens and of evaluation of the respective properties were as follows.

(1) Specimens for the tension test and Izod impact test:

The specimens were molded with an injection molding machine (supplied by Sumitomo Heavy Industries, Ltd) at a cylinder temperature of 190° C., mold temperature of 40° C. and a molding cycle of 60 seconds.

(2) Melt index (MI):

Measured at a temperature of 190° C. under a load of 2.16 kg according to ASTM D1238.

(3) Tension test of weld portions:

An autograph (supplied by Shimadzu Corp.) was used. Specimens were measured for the tensile strength and elongation at break of weld portions according to the method prescribed in ASTM D638.

(4) Izod impact test:

With an Izod impact tester (supplied by Toyo Seiki Seisakusho), the specimens were measured for notched Izod impact strength according to the method of ASTM D256.

EXAMPLE 1

80 Parts by weight (8 kg) of a polyacetal (copolymer type, MI=9), 20 parts by weight (2 kg) of a polyester type non-crosslinked thermoplastic polyurethane (PANDEX T-1180, supplied by Dainippon Ink & Chemicals Inc., to be referred to as "TPU-1" hereinafter) and 1 part by weight (0.1 kg) of pentaerythritol were weighed out, and mixed with a super mixer for 5 minutes by a conventional method. Further, 1 part by weight (0.1 kg) of diphenylmethane-4,4'-diisocyanate was added, and mixed for 1 minute. The resultant resin mixture was charged into a hopper, then melt-mixed with a co-rotating twin-screw extruder at a resin temperature of 210° C. for a residence time of 1 minute under shear force, and pelletized according to a conventional method.

The resultant pellets were injection-molded to prepare test specimens, and the specimens were measured according to the test methods described above to show a tensile strength of 371 kg/cm$^2$ in a weld portion, a tensile elongation of 30% in a weld portion and an Izod impact strength of 23 kg.cm/cm. Further, the above resin mixture was also measured for a melt index (MI) to show 1.1.

EXAMPLE 2

80 Parts by weight (8 kg) of a polyacetal (copolymer type, MI=9), 20 parts by weight (2 kg) of a polyester type non-crosslinked thermoplastic polyurethane (TPU-1) and 1 part by weight (0.1 kg) of trimethylolethane were weighed out, and mixed with a super mixer for 2 minutes by a conventional method. The resultant mixture was melt-mixed with a co-rotating twin-screw extruder at a resin temperature of 190° C. for a residence time of 30 seconds under shear force, and extruded according to a conventional method to prepare pellets.

The pellets were fully dried, and 1 part by weight (0.1 kg) of diphenylmethane-4,4'-diisocyanate was added to the pellets and fully mixed for 1 minutes. The resultant resin mixture was charged into a hopper, then melt-mixed with a co-rotating twin-screw extruder at a resin temperature of 210° C. for a residence time of 2 minutes under shear force, and again pelletized according to a conventional method.

The resultant pellets were injection-molded to prepare test specimens, and the specimens were measured according to the test methods described above to show a tensile strength of 373 kg/cm$^2$ in a weld portion, a tensile elongation of 26% in a weld portion and an Izod impact strength of 21 kg.cm/cm. Further, the above resin mixture was also measured for a melt index (MI) to show 1.3.

EXAMPLE 3

90 Parts by weight (9 kg) of a polyacetal (homopolymer type, MI=10), 10 parts by weight (1 kg) of a polyester type non-crosslinked thermoplastic polyurethane (TPU-1) and 0.5 part by weight (0.05 kg) of pentaerythritol were weighed out, and mixed with a super mixer for 5 minutes by a conventional method. The resultant resin mixture was charged into a hopper, and while the mixture was melt-mixed with a co-rotating twin-screw extruder at a resin temperature of 200° C. for a residence time of 1 minute under shear force, 0.5 part by weight (0.05 kg) of toluylene diisocyanate was added. The resultant polyacetal resin composition was pelletized according to a conventional method to give an impact-resistant polyacetal resin composition of the present invention.

The resultant pellets were injection-molded to prepare test specimens, and the specimens were measured according to the test methods described above to show a tensile strength of 487 kg/cm$^2$ in a weld portion, a tensile elongation of 23% in a weld portion and an Izod impact strength of 11 kg.cm/cm. Further, the above resin composition was also measured for a melt index (MI) to show 6.0.

EXAMPLES 4–15

Resin compositions were prepared from a polyacetal, a thermoplastic polyurethane, a polyvalent isocyanate and a polyhydric alcohol all shown in Tables 1 to 3 in their amounts shown in Tables 1 to 3 at a melting temperature shown in Tables 1 to 3 in the same manner as in Example 1. The resin compositions were pelletized in the same manner as in Example 1, and test specimens were prepared and evaluated in the same manner as in Example 1. Further, the resin compositions were evaluated for melt indexes in the same manner as in Example 1. Tables 1 to 3 show the results.

TABLE 1

| | Unit | Ex. 4 | Ex. 5 | Ex. 6 | Ex. 7 | Ex. 8 |
|---|---|---|---|---|---|---|
| POM-1 | Part by weight | 80 | 80 | 80 | 80 | 80 |
| TPU-1 | Part by weight | 20 | 20 | 20 | 20 | |
| TPU-2 | Part by weight | | | | | 20 |
| Isocyanate-1 | Part by weight | 1 | 1 | 1 | 1 | 1 |
| Polyhydric alcohol-1 | Part by weight | 0.5 | | | | 1 |

TABLE 1-continued

|  | Unit | Ex. 4 | Ex. 5 | Ex. 6 | Ex. 7 | Ex. 8 |
|---|---|---|---|---|---|---|
| Polyhydric alcohol-2 | Part by weight |  | 1 |  |  |  |
| Polyhydric alcohol-3 | Part by weight |  |  | 1 |  |  |
| Polyhydric alcohol-4 | Part by weight |  |  |  | 0.5 |  |
| 1,4-butane-diol | Part by weight |  |  |  |  | 1 |
| Melting temp. | °C. | 210 | 210 | 210 | 210 | 210 |
| Melt index | g/10 min. | 3.9 | 2.1 | 2.5 | 0.7 | 1.3 |
| Weld tensile strength | kg/cm² | 362 | 360 | 360 | 375 | 373 |
| Weld tensile elongation | % | 26 | 24 | 25 | 27 | 30 |
| Izod impact strength | kg.cm/cm | 22 | 21 | 22 | 23 | 23 |

Notes:
POM-1: Polyacetal copolymer having MI of 9
POM-2: Polyacetal copolymer having MI of 27
TPU-1: Polyester type thermoplastic polyurethane (Pandex T-1180, supplied by Dainippon Ink & Chemicals, Inc.)
TPU-2: Polyether type thermoplastic polyurethane (Kuramilon U 9180, supplied by Kuraray Co., Ltd.)
Isocyanate-1: Diphenylmethane-4,4'-diisocyanate
Polyhydric alcohol-1: Pentaerythritol
Polyhydric alcohol-2: Trimethylolethane
Polyhydric alcohol-3: Triethanolamine
Polyhydric alcohol-4: Dipentaerythritol

TABLE 2

|  | Unit | Ex. 9 | Ex. 10 | Ex. 11 | Ex. 12 |
|---|---|---|---|---|---|
| POM-1 | Part by weight | 80 | 80 | 80 | 80 |
| TPU-1 | Part by weight | 20 | 20 | 20 | 20 |
| Isocyanate-1 | Part by weight |  |  |  | 0.1 |
| Isocyanate-2 | Part by weight | 1 |  |  |  |
| Isocyanate-3 | Part by weight |  | 1 |  |  |
| Isocyanate-4 | Part by weight |  |  | 1 |  |
| Polyhydric alcohol-1 | Part by weight | 1 | 1 |  | 1 |
| Polyhydric alcohol-4 | Part by weight |  |  | 0.1 |  |
| Melting temp. | °C. | 210 | 210 | 210 | 210 |
| Melt index | g/10 min. | 3.9 | 2.1 | 2.5 | 5.7 |
| Weld tensile strength | kg/cm² | 362 | 360 | 360 | 350 |
| Weld tensile elongation | % | 27 | 28 | 23 | 11 |
| Izod impact strength | kg.cm/cm | 24 | 23 | 22 | 18 |

Notes:
POM-1: Polyacetal copolymer having MI of 9
TPU-1: Polyester type thermoplastic polyurethane
Isocyanate-1: Diphenylmethane-4,4'-diisocyanate
Isocyanate-2: Isophoronediisocyanate
Isocyanate-3: m-Xylylenediisocyanate
Isocyanate-4: Hexamethylenediisocyanate
Polyhydric alcohol-1: Pentaerythritol
Polyhydric alcohol-4: Dipentaerythritol

TABLE 3

|  | Unit | Ex. 13 | Ex. 14 | Ex. 15 | Ex. 16 | Ex. 17 |
|---|---|---|---|---|---|---|
| POM-1 | Part by weight |  |  | 95 |  |  |
| POM-2 | Part by weight | 70 | 50 |  | 80 | 80 |
| TPU-1 | Part by weight | 30 | 20 | 5 | 20 | 20 |
| TPU-2 | Part by weight |  | 30 |  |  |  |
| Isocyanate-1 | Part by weight |  |  |  | 1 | 1 |
| Isocyanate-3 | Part by weight | 0.5 | 0.5 | 5 |  |  |
| Polyhydric alcohol-1 | Part by weight |  |  |  | 1 | 1 |
| Polyhydric alcohol-2 | Part by weight | 0.5 | 0.5 | 2 |  |  |
| 1,4-butane-diol | Part by weight |  |  | 0.5 | 3 |  |
| Melting temp. | °C. | 210 | 210 | 210 | 180 | 250 |
| Melt index | g/10 min. | 1.1 | 1.0 | 0.1 | 7.6 | 4.5 |
| Weld tensile strength | kg/cm² | 310 | 215 | 413 | 370 | 364 |
| Weld tensile elongation | % | 36 | 65 | 18 | 24 | 30 |
| Izod impact strength | kg.cm/cm | 53 | >100 | 11 | 21 | 22 |

Notes:
POM-1: Polyacetal copolymer having MI of 9
POM-2: Polyacetal copolymer having MI of 27
TPU-1: Polyester type thermoplastic polyurethane
TPU-2: Polyether type thermoplastic polyurethane
Isocyanate-1: Diphenylmethane-4,4'-diisocyanate
Isocyanate-3: m-Xylylenediisocyanate
Polyhydric alcohol-1: Pentaerythritol
Polyhydric alcohol-2: Trimethylolethane

Comparative Examples 1-4

Resin compositions were prepared in the same manner as in Example 1 except that the amounts of the polyacetal and the thermoplastic polyurethane were changed as shown in Table 4 and that the polyvalent isocyanate compound and the polyhydric alcohol were not incorporated. The resin compositions were pelletized in the same manner as in Example 1, and test specimens were prepared and evaluated in the same manner as in Example 1. Further, the resin compositions were evaluated for melt indexes in the same manner as in Example 1. Table 4 shows the results.

TABLE 4

|  | Unit | Comp. Ex. 1 | Comp. Ex. 2 | Comp. Ex. 3 | Comp. Ex. 4 |
|---|---|---|---|---|---|
| POM-1 | Part by weight | 100 | 90 | 80 | 70 |
| TPU-1 | Part by weight | 0 | 10 | 20 | 30 |
| Isocyanate | Part by weight | 0 | 0 | 0 | 0 |
| Polyhydric alcohol | Part by weight | 0 | 0 | 0 | 0 |
| Melting temp. | °C. | 210 | 210 | 210 | 210 |
| Melt index | g/10 min. | 9.0 | 8.7 | 6.5 | 5.8 |
| Weld tensile strength | kg/cm² | 587 | 426 | 348 | 302 |
| Weld tensile elongation | % | 9 | 6 | 5 | 5 |
| Izod impact strength | kg.cm/cm | 6 | 7 | 15 | 27 |

Notes:
POM-1: Polyacetal copolymer having MI of 9
TPU-1: Polyester type thermoplastic polyurethane

Comparative Example 5

A resin composition was prepared in the same manner as in Example 1 except that no polyhydric alcohol was used. The resin composition was pelletized in the same manner as in Example 1, and test specimens were prepared and evaluated in the same manner as in Example 1. Further, the resin composition was evaluated for a melt index in the same manner as in Example 1. Table 5 shows the results.

TABLE 5

|  | Unit | Comp. Ex. 5 |
|---|---|---|
| POM-1 | Part by weight | 80 |
| TPU-1 | Part by weight | 20 |
| Isocyanate-1 | Part by weight | 1 |
| Polyhydric alcohol-1 | Part by weight | 0 |
| Melting | °C. | 210 |

TABLE 5-continued

|  | Unit | Comp. Ex. 5 |
|---|---|---|
| temp. | | |
| Melt index | g/10 min. | 0.1 |
| Weld tensile strength | kg/cm$^2$ | 363 |
| Weld tensile elongation | % | 17 |
| Izod impact strength | kg.cm/cm | 15 |

Notes:
POM-1: Polyacetal copolymer having MI of 9
TPU-1: Polyester type thermoplastic polyurethane
Isocyanate-1: Diphenylmethane-4,4'-diisocyanate

What is claimed is:

1. A process for producing an impact-resistant polyacetal resin composition, which comprises mixing with shear a polyacetal resin (A), a thermoplastic polyurethane (B), a polyhydric alcohol (C) selected from the group consisting of glycerine, trimethylolethane, trimethylolpropane, hexantriol, triethanolamine, diglycerine, pentaerythritol, tetraethanol, ethylenediamine, methylglucosite, aromatic diamine-tetraethanol adduct, sorbitol, dipentaerythritol, cyclodextrin, a phenoxy resin and polyvinyl alcohol, and at least one compound (D) selected from the group consisting of a polyisocyanate ($d_1$) and a compound ($d_2$) which generates a polyisocyanate under heat, while at least two components (A) and (B) are melted.

2. The process of claim 1, wherein the polyacetal resin (A), the thermoplastic polyurethane (B), the polyhydric alcohol (C) having at least three hydroxyl groups in the molecule and at least one compound (D) selected from the group consisting of a polyisocyanate ($d_1$) and a compound ($d_2$) which generates a polyisocyanate are used in a mixing weight ratio which satisfy the following equations, $$(A)/(B) = 97/3 \text{ to } 60/40 \qquad (1)$$

$$(C)/\{(A)+(B)\} = 0.01/100 \text{ to } 10/100 \qquad (2)$$

$$(D)/\{(A)+(B)\} = 0.01/100 \text{ to } 10/100 \qquad (3)$$

wherein (A), (B), (C) and (D) represent the weights of the components (A), (B), (C) and (D), respectively, provided that when the compound (D) is the compound ($d_2$) which generates a polyisocyanate under heat, the stoichiometric amount of the polyisocyanate to be generated should be taken as the weight of the compound (D).

3. The process of claim 1, wherein the mixing is carried out at a temperature between 180° and 250° C.

4. The process of claim 1, wherein the mixing is carried out at a shearing rate of 1 to $10^4$ sec$^{-1}$.

5. The process of claim 1, wherein a polyacetal resin having a melt index, measured according to ASTM D 1238 at 190° C. under a load of 2.16 kg, of at least 0.01 g/10 minutes is used as the polyacetal resin (A).

6. The process of claim 1, wherein a thermoplastic polyurethane having a melt flow rate, measured according to ASTM D 1238 at 190° C. under a load of 21.6 kg, of at least 0.1 g/10 minute is used as the thermoplastic polyurethane (B).

7. The process of claim 1, wherein a reaction product obtained by reacting a diisocyanate with a diol in an NCO/OH molar ratio of 0.5 to 2 is used as the thermoplastic polyurethane (B).

8. The process of claim 1, wherein a polyhydric alcohol having 3 to 100 carbon atoms and 3 to 5 hydroxyl groups in the molecule is used as the polyhydric alcohol (C).

9. An impact-resistant polyacetal resin composition obtained by the process recited in claim 1.

10. An article obtained by injection-molding an impact-resistant polyacetal resin composition obtained by the process recited in claim 9.

* * * * *